United States Patent [19]

Schleich

[11] Patent Number: 4,767,607

[45] Date of Patent: Aug. 30, 1988

[54] METHOD FOR PRODUCTION OF HIGH PURITY ALUMINUM NITRIDES

[75] Inventor: Donald M. Schleich, Brooklyn, N.Y.

[73] Assignee: The Polytechnic University, Brooklyn, N.Y.

[21] Appl. No.: 92,329

[22] Filed: Sep. 2, 1987

[51] Int. Cl.$^4$ ............................................. C01B 21/06
[52] U.S. Cl. .................................. 423/412; 423/500; 423/648.1
[58] Field of Search .................. 423/412, 500, 648 R; 501/96

[56] References Cited

U.S. PATENT DOCUMENTS

| | | | |
|---|---|---|---|
| 4,680,278 | 7/1987 | Inoue et al. | 423/412 |
| 4,687,657 | 8/1987 | Clark et al. | 423/412 |

FOREIGN PATENT DOCUMENTS

| | | | |
|---|---|---|---|
| 2833904 | 2/1979 | Fed. Rep. of Germany | 501/96 |
| 126697 | 10/1979 | Japan | 423/412 |
| 91008 | 5/1986 | Japan | 423/412 |

Primary Examiner—John Doll
Assistant Examiner—Wayne A. Langel
Attorney, Agent, or Firm—Curtis, Morris & Safford

[57] ABSTRACT

An efficient, low-temperature process for the preparation of highly pure, free-flowing aluminum nitride powder without oxygen contamination, comprising the steps of:

(1) forming a mixture of
  (a)

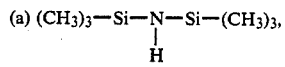

and
  (b) $AlCl_3$;

(2) reacting the mixture formed in step (1) at a temperature of from 0° C. to 150° C. and thereby forming

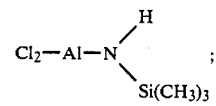

(3) maintaining the $Cl_2$—Al—NH—Si(CH$_3$)$_3$ formed in step (2) at a temperature of from 170° C. to 200° C. and thereby forming Cl—Al—NH and (CH$_3$)$_3$—SiCl; and (4) maintaining the Cl—Al—NH formed in step (3) at a temperature of at least 450° C. and thereby forming $H_2$, $Cl_2$, and AlN.

10 Claims, No Drawings

METHOD FOR PRODUCTION OF HIGH PURITY ALUMINUM NITRIDES

This invention relates to methods for the production of high purity aluminum nitride. More specifically, this invention relates to the production of high purity, free-flowing aluminum nitride powders with high surface area which are satisfactory for use in ceramic or catalytic applications. This invention further relates to efficient methods for economically producing high purity aluminum nitride powders free of oxygen contamination in gas or liquid phase reactions using a single reactor and readily obtainable and purifiable starting materials.

BACKGROUND OF THE INVENTION

Aluminum nitride is a refractory material of increasing importance in the electronics industry. In pure form, it has several unique physical properties, of which probably the most important is its combination of low electrical conductivity with high thermal conductivity, and a thermal expansion coefficient comparable to that of silicon. Although low electrical conductivity is common to many refractory materials, it is rarely found accompanied by high thermal conductivity and ideal expansion coefficient. Other electrically insulating materials with interesting thermal properties are either prohibitively expensive (e.g., diamond), or highly toxic (e.g., BeO). Aluminum nitride is also resistant to high temperature and somewhat resistant to oxidation and chemical attack.

As is the case for most nitrides, the reaction of the pure metal with nitrogen gas is extremely difficult. The inert, triply bonded diatomic nitrogen molecule does not readily react. In order for reaction to occur, the temperature must be elevated.

It is not possible to react solid aluminum with nitrogen gas since temperatures above 1000° C. are necessary, well above the melting point of aluminum. The reaction of the molten aluminum with nitrogen is also difficult because of the reduced surface area.

There are several known reaction procedures for preparing AlN. The best known process reactions are set forth in the following formulae.

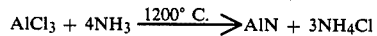  (1)

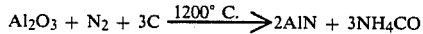  (2)

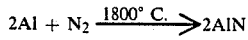  (3)

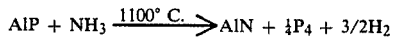  (4)

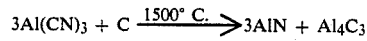  (5)

In all of the above reactions, especially those where the reaction temperatures are greater than 1200° C., one is confronted with the problem of selecting a reaction vessel. This is especially critical where electronic grade material, which must be free from metal and oxygen contamination, is being produced. In addition, except when the aluminum is supplied as $Al_2O_3$ or AlP, the known reactions occur in the gas phase. Gas phase reactions allow for continuous regrowth after nucleation and substantially and undesirably increase particle size.

The use of aluminum phosphide (AlP) as a starting material is not industrially desirable for several reasons. First, AlP is very difficult to prepare as a pure compound. Second, the phosphorus component is expensive, toxic, and highly inflammable. In addition, any leaks within the reactor containing phosphorus and hydrogen at 1100° C. could have catastrophic results.

Aluminum oxide is readily obtainable. However, its highly refractory nature creates problems. The temperature for reaction (2000° C.) requires the use of the most refractory reaction vessels and since the Al-O bond is very strong, it is difficult to obtain material with no residual oxygen. Moreover, it is very difficult to remove metal impurities from $Al_2O_3$ prior to reaction. It is also necessary to use very high purity carbon in this reaction process if metal contamination is to be avoided.

The art has therefore failed to provide an economical, low-temperature process for the production of pure aluminum nitride.

OBJECTS OF THE INVENTION

It is thus a primary object of this invention to produce at low temperatures highly pure aluminum nitride powders having high surface area (small particle size).

It is a further and important object of this invention to produce highly pure aluminum nitride powders free of oxygen contamination in a flexible, low-temperature process which employs conventional reaction vessels.

It is a related object of this invention to provide a low-temperature, efficient process for the production of highly pure aluminum nitride powders which uses readily obtainable and purifiable starting materials and which can be practiced in the gas or liquid phase in a single reaction vessel.

It is an additional object of this invention that the main by-product, trimethyl silyl chloride, can be readily and inexpensively converted to the initial reagent, hexamethyldisilazane.

Statement of The Invention

These and other objects of the invention are achieved in a process wherein hexamethyldisilazane (HMDS) which has the structural formula

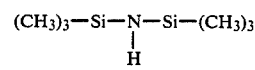

is reacted with aluminum trichloride ($AlCl_3$) to form a complex, $Cl_2$—Al—NH—Si($CH_3$)$_3$, and trimethylsilylchloride (TMSCl) ($CH_3$)$_3$—Si—Cl; the $C_2$—Al—N-H—Si($CH_3$)$_3$, a white powder, is separated from the TMSCl and then heated to an elevated temperature, typically 170° C. to 200° C., to form Cl—Al—NH and additional TMSCl. The Cl—Al—NH is separated from TMSCl and heated to a temperature above 450° C., preferably above 700° C. to drive off residual hydrogen and chlorine and produce highly pure aluminum nitride.

In a broader aspect, the invention is a method for the preparation of aluminum nitride comprising the steps of:
 (1) forming a mixture of
  (a)

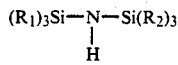

where $R_1$ and $R_2$ are each alkyl groups containing 1 to 4 carbon atoms, and (b) $AlCl_3$;

(2) reacting the mixture formed in step (1) at an elevated temperature, for example from 0° C. to 150° C., and thereby forming a mixture of $Cl_2-Al-N-H-Si-(R_1)_3$, $Cl_2-Al-NH-Si-(R_2)_3$, $(R_1)_3-Si-Cl$, and $(R_2)_3-Si-Cl$;

(3) converting the compounds found in step (2) at elevated temperatures to $(R_1)_3-Si-Cl$, $(R_2)_3-Si-Cl$, $H_2$, $Cl_2$, and AlN; and (4) separating the $H_2$, $Cl_2$, and AlN from the mixture converted.

In an analogous reaction sequence, nonamethyltrisilazane (NMTS),

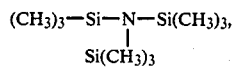

can be reacted with aluminum chloride to form a complex,

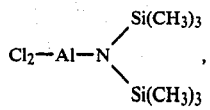

and TMSCl. The complex is then heated at 170° to 200° C. to form pure aluminum nitride and additional TMSCl. This amorphous aluminum nitride can then be heated to 700° C. or more to produce crystalline AlN.

DESCRIPTION OF THE PREFERRED EMBODIMENTS

Preparation of Aluminum Nitride (AlN) from Hexamethyldisilazane (HMDS) and Aluminum Trichloride (AlCl₃)

Aluminum trichloride can be added directly to or sublimed into the reaction flask. Hexamethyldisilazane is also added or distilled into the reaction flask. The temperature is raised to reflux, i.e., 90°–120° C. A fine white precipitate forms and trimethylsilylchloride (TMSCl) is also formed. The precipitate is separated from the reaction mixture by evaporation or filtration. The resultant white free-flowing powder has the formula $Cl_2Al:HNSiMe_3$ [I]. Chemical and NMR analysis indicate that at temperatures up to 120° C., one mole of TMSCl is formed per mole of $AlCl_3$ even with addition of excess HMDS.

Upon heating this white powder at temperatures ranging from 170°–200° C., an additional mole of TMSCl is liberated, as verified by quantitative NMR and mass spectral analysis. The resulting material is a free-flowing white powder. It is separated from the TMSCl by evaporation or filtration. The compound [II] has the formula Cl—Al—N—H and shows no crystalline peaks by X-ray powder diffraction. IR measurements show a broad sketch at approximately 3500 cm$^{-1}$ indicative of N-H stretching, as well as a broad peak at approximately 600 cm$^{-1}$ indicative of AlN.

Further heating of this compound under either inert gas or vacuum to temperatures above 450° C. results in the elimination of chlorine. This is verified by weight loss, mass spectrometer, and the oxidation of moist potassium iodide by the eliminated gas. IR spectra after 500° C. heating still indicate the presence of some hydrogen contamination; however, less than before heating. After heating samples for two hours under vacuum no discernible X-ray powder diffraction pattern appears.

Heating at 700° C. removes the residual hydrogen as evidenced by a flat IR spectrum in the frequency range of 4000-2000 cm$^{-1}$. The resulting compound shows a substantially sharper Al-N infrared peak at 600 cm$^{-1}$ than the compound heated at 500° C. The sample heated to 700° C. shows a clear X-ray powder diffraction pattern indicative of AlN. The peaks are broadened as expected for material of small particle size. Surface area measurement by the B.E.T. method using $N_2$ gas indicates a surface area of 100–200 m$^2$/g.

The reaction procedure can be modified in several ways. High surface area, free-flowing AlN is synthesized in all such modifications. For example, the initial mixture of $AlCl_3$ and HMDS can be formed in a solvent. Methylene chloride, dichloroethane or carbon disulfide can be used as solvents; any other solvent which dissolves $AlCl_3$ and silazane without chemical reaction is also suitable. In both cases, reaction occurs at room temperature. The white complex previously described precipitates from these solvents and the TMSCl remains in the solvent. The complex can then be isolated and treated as previously described to prepare AlN.

The compounds I and II can also be treated with an active rather than inert gas when heating to aid in the elimination of chlorine. Compound II can be treated with dry ammonia gas at 700° C. Freely flowing crystalline AlN with a surface area of 100–200 m$^2$/g is obtained. The by-product from this reaction is $NH_4Cl$ which sublimes away from the AlN at low temperatures.

In this reaction scheme, the first two steps, resulting in the liberation of two moles of TMSCl, occur at low temperature (less than 200° C.) and facilitate the simple isolation of this expensive by-product without decomposition by pyrolysis. Because there is no decomposition, the final product is not contaminated with either silicon or carbon.

Preparation of Aluminum Nitride (AlN) from: Nonmethyltrisilazane (NMTS) and Aluminum Trichloride (AlCl₃)

Pure $AlCl_3$ and NMTS are added to the reaction flask as previously described. At room temperature, without solvent, both compounds are solids and no rapid reaction takes place. However, upon heating to approximately 80° C., a white powder precipitates from a liquid. This free-flowing white powder [III] has the formula $(Me_3Si)_2N:AlCl_2$. The liquid phase contains 1 mole of TMSCl per mole of $AlCl_3$. Liberation of one mole of TMSCl does not change even upon the addition of a three-fold excess of NMTS.

The free-flowing white powder is isolated from the liquid by evaporation or filtration and treated thermally in either inert gas or vacuum at 170°–200° C. Upon heating to this temperature, two moles of TMSCl are liberated per mole of compound III as determined by quantitative NMR. The resulting material with the chemical composition AlN is amorphous to X-ray powder diffraction. It is separated from the reaction mixture by evaporation or filtration. This powder shows IR absorption at approximately 600 cm$^{-1}$ indicative of AlN.

The amorphous AlN can be heated to higher temperatures to prepare crystalline AlN. Higher temperatures or longer time periods are required to obtain crystalline material of the same particle size as obtained from the HMDS reaction. Samples heated in vacuum for one day at 700° C. are still amorphous and samples heated for one day under dry ammonia at 700° C. show a surface area of 200–300 m$^2$/g.

Performing the reaction in a solvent such as CH$_2$Cl$_2$ or CS$_2$ does not yield a white free-flowing powder. Initially, a translucent gel is formed which transforms into a black polymeric substance after aging or heating. This black material can be converted into AlN by high temperature processing identical to that previously described.

The above techniques, starting with either HMDS or NMTS, permit the production of high purity AlN at temperatures below 800° C. While additional heating can be performed on the high surface area material to induce sintering and lower the chemical reactivity of the substance if desired, the reactions of the invention produce high surface area, pure material by rapid precipitation at low temperatures, thus preventing regrowth and impurity incorporation.

The reactions described can be slightly modified by performing the entire reaction in the gas phase due to the high vapor pressure of AlCl$_3$ and either silazane. In this case, again because of the low temperature and rate of reaction, a free-flowing high surface area powder is synthesized.

The invention is further described in the following Examples.

EXAMPLES

Example I 10 g of pure AlCl$_3$ are added to a flask under inert gas. 50 ml of freshly distilled hexamethyldisilazane are added. The reaction flask is maintained at 100° C. for 2 hours. A white precipitate is formed. The resultant liquid is a mixture of trimethyl silyl chloride and unreacted hexamethyldisilazane. The liquid is removed under vacuum while gently heating the flask. A white free-flowing powder remains which has the formula Cl$_2$AlNH—Si(CH$_3$)$_3$. This powder is loaded into a tube capable of withstanding higher temperatures and heated to 700° C. under vacuum. The resulting material is crystalline AlN with a surface area of 200 m$^2$/g as determined by B.E.T. measurements using N$_2$ as the adsorbing gas. The white powder presents an X-ray diffraction pattern identical to that of BN.

Example II 10 g of pure AlCl$_3$ are added to a flask under inert gas. 50 ml of freshly distilled hexamethyldisilazane are added. The reaction flask is maintained at 100° C. for 2 hours. A white precipitate is formed. The liquid phase is removed by filtration. The solid phase is heated under flowing dry nitrogen to 200° C. The reaction vessel is now heated to 700° C. under flowing dry ammonia gas. The powder is removed and analyzes as AlN with a surface area of 150 m$^2$/g.

Example III 10 g of pure AlCl$_3$ are added to a flask containing 50 ml of dry methylene chloride. 50 ml of freshly distilled hexamethyldisilazane are added and the entire mixture is kept under dry nitrogen while refluxed for 2 hours. A white precipitate is isolated by filtration. The precipitate is placed in a reaction tube under flowing nitrogen and the temperature is slowly raised to 750° C. (4° C./min). The resulting white powder analyzes as AlN and B.E.T. analysis of the sample showed a surface area of 200 m$^2$/g.

Example IV 10 g of pure AlCl$_3$ are added to a flask under dry nitrogen. 50 g of nonamethyltrisilazane are added and the mixture is heated to 100° C. A white powder is isolated by filtering. The white powder is heated under vacuum at 175° C. for 4 hours. The resulting powder shows no crystalline peaks and an FTIR spectrum indicative of AlN. The white powder is heated under flowing dry NH$_3$ for 5 hours. This white powder analyzes as crystalline AlN. A surface area of 250 m$^2$/g was determined by B.E.T. techniques.

What is claimed is:

1. A method for the preparation of aluminum nitride comprising the steps of:
   (1) forming a mixture of

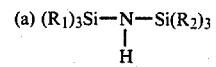

where R$_1$ and R$_2$ are each alkyl groups containing 1 to 4 carbon atoms, and
   (b) AlCl$_3$;
   (2) reacting the mixture formed in step (1) at a temperature of from 0° C. to 150° C. and thereby forming a mixture of Cl$_2$—Al—NH—Si—(R$_1$)$_3$, Cl$_2$—Al—NH—Si—(R$_2$)$_3$, (R$_1$)$_3$—Si—Cl, and (R$_2$)$_3$—Si—Cl;
   (3) converting the compounds formed in step (2) at elevated temperatures to (R$_1$)$_3$—Si—Cl, (R$_2$)$_3$—Si—Cl, H$_2$, Cl$_2$, and AlN; and
   (4) separating the H$_2$, Cl$_2$, and AlN from the mixture converted.

2. A method for the preparation of aluminum nitride comprising the steps of:
   (1) forming a mixture of (a) (CH$_3$)$_3$—Si—N(H)—Si—(CH$_3$)$_3$, and
   (b) AlCl$_3$;
   (2) reacting the mixture formed in step (1) at a temperature of from 0° C. to 150° C. and thereby forming

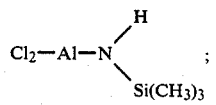

(3) maintaining the

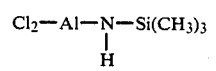

formed in step (2) at a temperature of from 170° C. to 200° C. and thereby forming Cl—Al—NH and (CH$_3$)$_3$—SiCl; and (4) maintaining the Cl—Al—NH formed in step (3) at a temperature of at least 450° C. and thereby forming H$_2$, Cl$_2$, and AlN.

3. A method as recited in claim 2 wherein the mixture formed in step (1) is reacted at a temperature of 0° C. to 150° C. for a period of from 0.5 to 5 hours.

4. A method as recited in claim 2 wherein the Cl$_2$—Al—NH—Si(CH$_3$)$_3$ formed in step (2) is a fine powder and said powder is separated from the (CH$_3$)$_3$—Si—Cl formed in step (2).

5. A method as recited in claim 4 wherein the Cl$_2$—Al—NH—Si(CH$_3$)$_3$ powder is maintained at a temperature of from 170° to 200° C. to form Cl—Al—NH and (CH$_3$)$_3$—Si—Cl.

6. A method as recited in claim 5 wherein the Cl—Al—NH formed is a fine powder and said powder is separated from the (CH$_3$)$_3$—Si—Cl found in claim 2.

7. A method as recited in claim 6 wherein the Cl—Al—NH powder is maintained at a temperature above 450° C. for at least 1 hour and at a temperature above 700° C. for at least 1 hour to form AlN.

8. A method as recited in claim 2 wherein the mixture formed in step (1) includes a solvent selected from the group consisting of methylene chloride, carbon disulfide, dichloroethane, and any other solvent which dissolves AlCl$_3$ and silazane without chemical reaction.

9. A method as recited in claim 2 wherein one or both of the Cl$_2$—Al—NH—Si(CH$_3$)$_3$ formed in step (2) and the Cl—Al—NH found in step (3) are maintained at elevated temperatures in the presence of an active gas selected from the group consisting of ammonia or hydrogen.

10. A method for the preparation of aluminum nitride comprising the steps of:
(1) forming a mixture of
   (a)

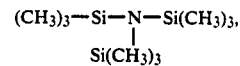

and
   (b) AlCl$_3$;

(2) reacting the mixture formed in step (1) at a temperature of from 60° C. to 150° C. and thereby forming

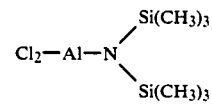

(3) maintaining the Cl$_2$—Al—N—[Si(CH$_3$)$_3$]$_2$ formed in step (2) at a temperature of from 170° C. to 200° C. and thereby forming 2(CH$_3$)$_3$—SiCl and amorphous AlN; and (4) heating the AlN formed in step (3) to at least 700° C. to transform the material to crystalline AlN.

* * * * *